Oct. 20, 1964 SHINTARO OSHIMA ETAL 3,153,701

REGENERATIVE REPEATER FOR A TIME DIVISION MULTIPLEX START-STOP TELEGRAPH SWITCHING SYSTEM

Filed Jan. 23, 1962 3 Sheets-Sheet 2

United States Patent Office 3,153,701

Patented Oct. 20, 1964

3,153,701

REGENERATIVE REPEATER FOR A TIME DIVISION MULTIPLEX START-STOP TELEGRAPH SWITCHING SYSTEM

Shintaro Oshima, Musashino-shi, Tokyo-to, and Yukio Nakagome, Nerima-ku, Tokyo-to, Japan, assignors to Kokusai Denshin Denwa Kabushiki Kaisha, Tokyo-to, Japan, a joint-stock company of Japan Filed Jan. 23, 1962, Ser. No. 168,045
Claims priority, application Japan Jan. 30, 1961
2 Claims. (Cl. 178—50)

The present invention relates to a time division telegraph switching system and more particularly to a novel time division telegraph switching system utilizing a time division multiplex telegraph regenerative repeater.

In general, since the conventional time division switching system carries out switching of a plurality of calls by using each switching element in a time divisional manner, the apparatus embodying the system becomes small-sized in comparison with other space division switching systems or frequency division switching systems. Accordingly, the time division switching system is very economical in the matter of the floor space which is necessary for the apparatus, cost, and electric power consumption for driving the apparatus, but has disadvantages such as the requirement of more time division channels, the less the sampling pulses contained in a unit code element become and the more the telegraph distortion due to quantization occurs in the case of application of the system to switching of a telegraph circuit. When the time division system is applied to switching telegraph circuits, since the telegraph signal has only two states of mark and space, such a nonlinear element as, for example, a gate circuit used in a digital control circuit, can be advantageously used. However, the number of calls capable of being simultaneously connected by means of the time divisional use of the switching elements is limited by the usable frequency band or the operation speed of the elements, or is influenced by the frequency band necessary to pass the signals to be switched. Let it be assumed that a time division switching system is composed of switching elements operating at a clock frequency of 50 kc./s., and the telegraph signals of 50 kilocycles are to be switched over. In this case, when the signal of each channel is sampled at a rate of sampling pulse of 500 c./s., 100 channels can be obtained, but the interval between each consecutive sampling pulses becomes 2 milliseconds, and a maximum telegraph distortion of 10% will be produced due to quantization in the case of 50 kilocycles signal having a 20 milliseconds duration of unit code element. This telegraph distortion will be summed up every time when the signal passes through the switching systems, whereby the quality of the signal becomes extremely deteriorated. On the other hand, when the sampling frequency is selected to be 5 kc./s., the interval between each consecutive sampling pulses becomes 0.2 millisecond, and the telegraph distortion due to the quantization becomes 1%, which is much lower than that of the former case. However, in this case, it is possible to obtain only ten time division channels. As described above, when decrease of telegraph distortion due to the quantization is required, the number of the time division channels capable of being switched decreases.

It is an essential object of the present invention to provide a new and improved time division telegraph switching system not having the above-mentioned disadvantages of the conventional time division telegraph switching system.

The above-mentioned objects and other objects of the invention have been attained by an improved system which comprises an input unit for converting input telegraph signals with start-stop code elements applied from a plurality of input lines into time division multiplex pulse signals; at least one transmission path or highway connected to the input unit; at least one time division multiplex telegraph regenerative repeater in each of the transmission paths, or highways; an output unit connected in said path or highway for distributing the time division multiplex signal to respective output lines. A control unit is provided for timing respective sampling pulses of the input unit with respective sampling pulses of the output unit whereby the input lines are connected respectively in a time divisional manner to the corresponding output lines so as to form respective telegraph channels. The system is characterized in that the repeater is composed of a start-stop generator which generates pulses having the same period as that of the time division multiplex pulse signal of the transmission path or highway. The pulses are allotted successively to respective channels per a period equal to the number of telegraph channels, times the period and starting to generate in an independent manner of each of said channels at an instant when the start code element of each channel has just been sampled. A start-stop counter counts the output pulses of the generator independently of each channel, thereby generating a pulse signal in a period equal to the duration of the telegraph signal element with no distortion independently of each channel and determining independently of each channel the duration of pulse trains comprising pulses generated successively from the pulse generator. A regenerative signal output circuit gates, independently of each channel, the time division multiplex signal of the highway by the use of the pulse signal, whereby the time division multiplex signal is generated independently of each channel.

According to this invention as described above, an independent compensation of the telegraph distortions in each of the time division channels can be made possible per channel by inserting a time divisional multiplex telegraph regenerative repeater per highway. Therefore, according to the present invention, a small-sized, economical time division switching system capable of carrying out time division switching without derivation of telegraph distortion due to the quantization can be obtained.

The nature and details of the present invention will be more clearly apparent by reference to the following description taken in connection with the accompanying drawings in which the same and equivalent parts are designated by the same reference numerals and characters, and in which.

Figure 1:
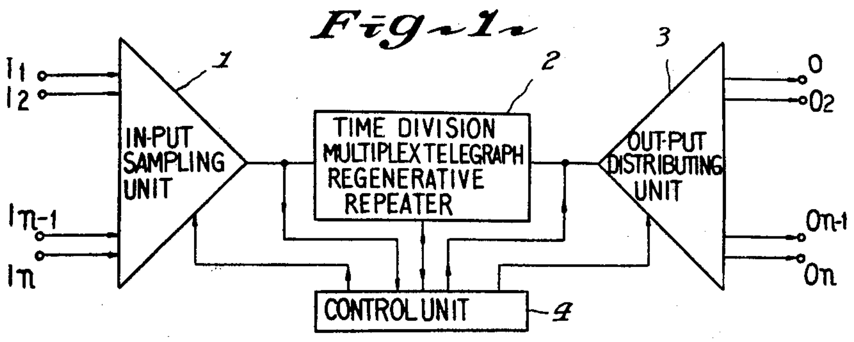
FIG. 1 is a block diagram for describing the general construction and operation of the system of the present invention.

General description of the construction and operation of a time division multiplex telegraph switching system of this invention will now be presented in connection with FIG. 1, in which the system consists of an input sampling unit 1, a time division multiplex telegraph regenerative repeater 2, an output distributing unit 3, and a control unit 4. In FIG. 1, the input lines from a number of subscribers are connected to the input terminals $I_1$, $I_2$, . . . $I_n$ of the input sampling unit 1. This unit 1 exhibits the same function as that of the conventional time division sampler, and each telegraph signal sent from each subscriber is converted into a time division multiplex signal in the input sampling unit 1 and then the time division multiplex signal is applied to the highway including the above-mentioned regenerative repeater 2. The regenerative repeater 2, that is, the time division multiplex telegraph regenerative repeater 2 effects compensation for the telegraph distortion of the time division multiplex signal by means of time divisional manner per respective time division channel and thereafter sends out the compensated time division multiplex signal into the output distributing unit 3. This output distributing unit 3 exhibits the same function as that of the conventional time division sampler and distributes each time division telegraph signal with no telegraph distortion derived from the regenerative repeater 2 to corresponding output terminals and sends out the signals into the output lines after demodulation thereof. The output lines connected to respective subscribers are connected, respectively, to corresponding output terminals. The control unit 4 has the function of synchronizing, per pair of lines to be connected to each other, the sampling pulse in the input sampling unit 1 and the corresponding gate pulse in the output distributing unit 3 and another function of sending out various signals to the subscribers so as to make the switching system carry out a switching operation.

In the following, the above-mentioned units will be described. The input sampling unit 1 may be of any type as long as it has the above-mentioned functions, so that said unit does not necessitate any particular circuit. That is, for example, it is possible to adopt a system in which gate circuits are disposed in parallel, the signal of each subscriber is introduced into the input terminal of the respective gate circuit. Each said input signal is converted into a time division signal in the respective gate circuit by using sampling pulses for time division, and the output signals of the gate circuits are introduced into a common sampling unit, thus converting the input signals into a time division multiplex signal. Accordingly, detailed description of the input sampling unit is omitted herein.

Figure 2:
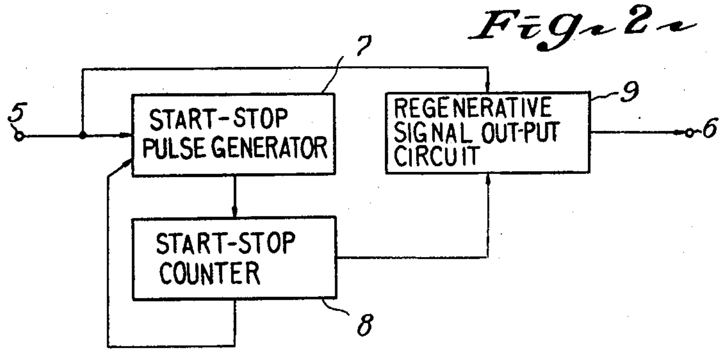
FIG. 2 is a block diagram for describing the general construction and operation of a time division multiplex telegraph regenerative repeater used in the system of the present invention.

Next, the time division multiplex telegraph regenerative repeater 2 will be described below. The principle of the present time division multiplex telegraph regenerative repeater can be applied to the regenerative repeating of a signal which does not having any start-stop code elements, that is, to the case of a synchronous telegraph signal. However, the following description relates to only the case in which a start-stop teleprinter signal is regeneratively repeated. The function of this unit has been described already, and this unit has, in general, a construction as shown in FIG. 2 in which a time division multiplex signal, which is an output of the input sampling unit 1, is introduced into the input terminal 5. The unit of FIG. 2 consists of a start-stop pulse generator 7, a start-stop counter 8, and a regenerative signal output circuit 9. The start-stop pulse generator 7 starts to generate pulses having the same period as that of the time division multiplex signal in the highway, in an independent, time divisional manner, per time division channel at such an instant as that of the start code of each channel in the time division multiplex telegraph signal has just been sampled. The start-stop counter 8 is supplied with the output of the pulse generator 7 and feeds back its output to the start-stop pulse generator 7 so as to stop independently pulse generation of the start-stop pulse generator per time division channel. The start-stop counter 8 controls the duration of the pulse generation of the said start-stop pulse generator 7 by independent, time-divisional counting of the output pulse of the generator 7 per time division channel and acts to send out the pulse signals to the regenerative signal output circuit 9 independently, time-divisionally in order to regenerate the telegraph signals of each of the time division channels per each channel. The regenerative signal output circuit 9 is controlled independently per time division channel by the above-mentioned time division multiplex signal which corresponds to the input signal of the input terminal 5 and by the signal regenerative output of the above-mentioned start-stop counter 8, whereby a time division multiplex signal having no telegraph distortion in each time division channel is produced. Accordingly, a time division multiplex signal having no telegraph distortion can be obtained out of the output terminal 6.

Figure 3:
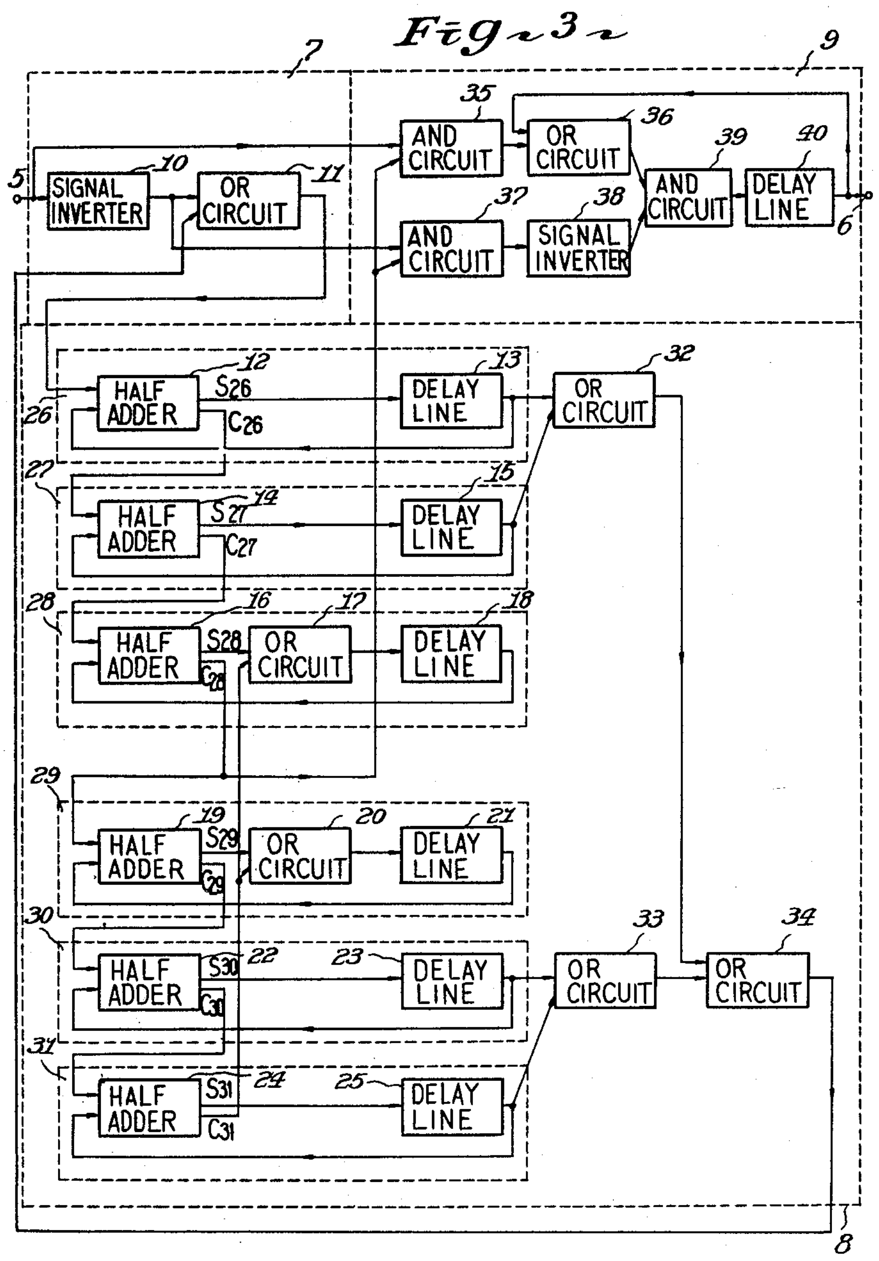
FIG. 3 is a block diagram for describing the construction and operation of the time division multiplex telegraph regenerative repeater of FIG. 2 in the case of its application to the start-stop teleprinter signal of five unit code.
Figure 4:
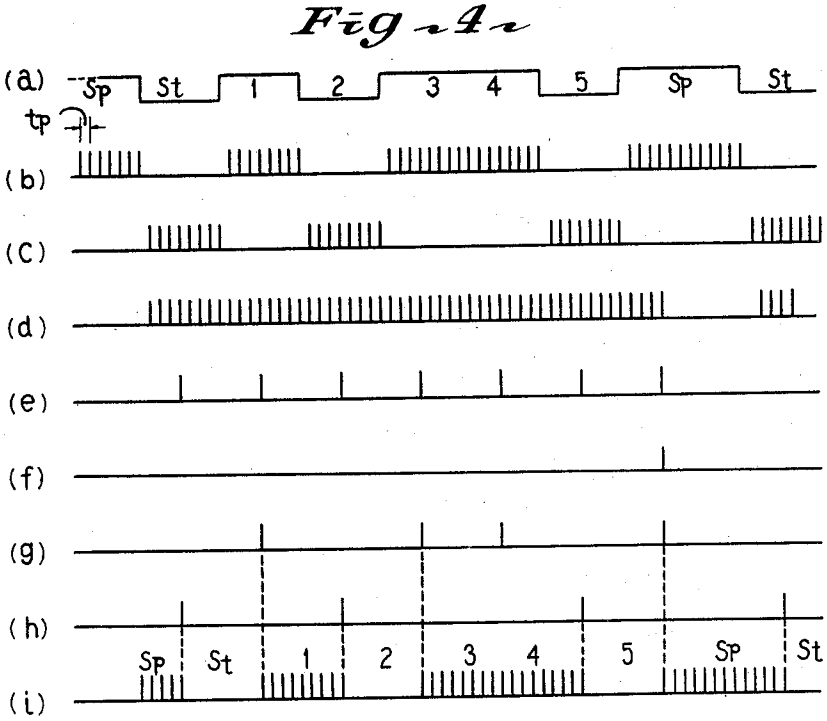
FIG. 4 is a wave form diagram for describing the operation of the time division multiplex telegraph regenerative repeater of FIG. 3.

In FIG. 3 is shown an example of the time division multiplex telegraph regenerative repeater such as that illustrated in FIG. 2. This example relates to the case in which regeneration and repeating of the start-stop teleprinter signal of a five unit code are carried out. In FIG. 3, terminals 5, 6 and enclosures 7, 8, and 9 designated by broken lines indicate, respectively, the same input terminals 5, the output terminals 6, the start-stop pulses generator 7, start-stop counter 8, and the regenerative signal output circuit 9 identical to those indicated by the same numerals in FIG. 2. In the following, operation of the time division multiplex telegraph regenerative repeater of FIG. 3 will be described in connection with FIGS. 4 and 5. In order to make the explanation more understandable, the case of a single time division channel will be described below. FIG. 4(*a*) is an example of a telegraph signal including a start code element $S_t$ and a stop code element $S_p$ in addition to the five unit code elements 1, 2, 3, 4, and 5. This signal having such polarities as indicated is sampled in the input sampling unit 1 and converted into such a pulse signal as shown in FIG. 4(*b*) and then impressed on the input terminal 5. This signal of FIG. 4(*b*) is reversed in its polarity by a signal inverter 10, whereby the said signal of FIG. 4(*b*) is converted into such a pulse signal as shown in FIG. 4(*c*). This signal as shown in FIG. 4(*c*) is introduced, by way of an OR circuit 11, into the start-stop counter 8.

A binary counter 26 consists of a half adder 12 and a delay line 13. The circuit elements 27, 28, 29, 30, and 31 indicated by broken lines comprise binary counters which include, respectively, a half adder 14 and a delay line 15, a half adder 16 and a delay line 18, a half adder 19 and a delay line 21, a half adder 22 and a delay line 23, and a half adder 24 and a delay line 25. Furthermore, the binary counters 28 and 29 include, respectively, OR circuits 17 and 20. Characters $S_{26}$, $S_{27}$, $S_{28}$, $S_{29}$, $S_{30}$, and $S_{31}$ in the half adders designate, respectively, the sums of the corresponding half adders, and the characters $C_{26}$, $C_{27}$, $C_{28}$, $C_{29}$, $C_{30}$, and $C_{31}$ designate, respectively, the carry outputs of corresponding half adders. The above-mentioned binary counters 26, 27, 28, 29, 30, and 31 are successively reset in the states of $\underline{0}$ $\underline{0}$ $\underline{1}$ $\underline{1}$ $\underline{0}$ and $\underline{0}$ in the case in which no pulse is introduced from the start-stop pulse generator 7. When a first pulse corresponding to the start code element $S_t$ is impressed on the half adder 12 of the binary counter 26 from the OR circuit 11, the binary counter 26 starts, and thereafter pulses having the same period as that of the sampling pulse are successively impressed on the binary counter 26 from the OR circuit 11 as will be described below. Delay time of the delay line 13 is set so as to be $t_p$ which is equal to the period of the sampling pulse. Accordingly, the carry output $C_{26}$ of the half adder 12 is produced at the instant when an output pulse of the delay line 13 coincides with and the second input pulse applied to the half adder 12. The said carry $C_{26}$ is impressed on the next binary counter 27 and so forth, and the carrys $C_{27}$, $C_{28}$, $C_{29}$, and $C_{30}$ and impressed, respectively, on the binary counters 28, 29, 30, and 31. The outputs of the delay lines 13 and 15 of the binary counters 26 and 27 are being impressed on the OR circuit 32, the outputs of the delay lines 23 and 25 of the binary counters 30 and 31 are being impressed on the OR circuit 33, and the output of the OR circuit 32 and output of the OR circuit 33 are being impressed on the OR circuit 34. Accordingly, a pulse signal such as is shown in FIG. 4(*d*) can be obtained from the OR circuit 11 connected to the output side of the OR circuit 34. Since the binary counters 26, 27, 28, 29, 30, and 31 have been successively reset to the states of $\underline{0}$ $\underline{0}$ $\underline{1}$ $\underline{1}$ $\underline{0}$ and $\underline{0}$, as described already, pulse trains such as are shown in FIGS. 4(*e*) and 4 (*f*) are obtained, respectively, from the output sides of the binary counters 28 and 31. That is, upon impression of pulses on the binary counter 26, a pulse train such as is shown in FIG. 4(*e*) is obtained as the carry output $C_{28}$ of the binary counter 28, but when four pulses are impressed on the binary counter 26, the initial pulse of the pulse train of FIG. 4(*e*) is produced, and the following pulse is produced per impression of eight pulses.

On the other hand, since the binary counters 29, 30, and 31, as described already, are in the reset state of $\underline{1}$ $\underline{0}$ and $\underline{0}$, when seven pulses are impressed on the binary counter 29 from the binary counter 28, the carry output $C_{31}$ is obtained from the binary counter 31. This carry output $C_{31}$ is impressed on the OR circuits 17 and 20, whereby the binary counters 28 and 29 are reset to the state of 1. Furthermore, all the binary counters 26, 27, 30, and 31 are in the state of 0, and the apparatus is reset to the original state of $\underline{0}$ $\underline{0}$ $\underline{1}$ $\underline{0}$ $\underline{0}$ and $\underline{0}$. This state will be held as long as the stop polarity signal continues. Accordingly, thereafter, no further counting is carried out unless a start code element is again received. When a start code element is again received, the previous operation is repeated.

The output (pulse train of FIG. 4(*e*)) of the counter 28 is introduced into the regenerative signal output circuit 9 together with such an input signal of the input terminal 5 as the pulse train of FIG. 4(*b*) and such an output pulse of the signal inverter 10 as is shown in FIG. 4(*c*). Accordingly, the output of the AND circuits 35 and 27 become, respectively, the pulse train of FIG. 4(*g*) and the pulse train of FIG. 4(*h*). Furthermore, the output of the AND circuit 35 is impressed on the OR circuit 36 together with the output of the delay circuit 40, and the output of the AND circuit 37 is impressed on the signal inverter 38. The outputs of the AND circuit 36 and the signal inverter 38 are impressed on the AND circuit 39, and the output of the AND circuit 39 is impressed on the delay circuit 40. Since the circuit consisting of the OR circuit 36, the AND circuit 39, and a delay circuit 40 exhibits the same operation as that of a bistable circuit, an output train such as that shown in FIG. 4(*i*) can be obtained from the delay line 40, the delay time of which is equal to the interval $t_p$ of the sampling pulse. The output pulse train of FIG. 4(*i*) does not include any telegraph distortion as long as the pulse interval of the pulse train of FIG. 4(*e*) is correct. That is, the input signal is regenerated so as to be converted into a signal having no unfavorable distortion, even when the said input signal includes a distortion, as long as the transition instant between mark and space does not exceed the position of the respective pulse signal as shown in FIG. 4(*e*) for detecting the polarity of each code element. Of course, the output of the said time division multiplex telegraph regenerative repeater 2 is a time division pulse as shown in FIG. 4(*i*).

In the time division multiplex telegraph regenerative repeater of this example, the unit code element is sampled by eight pulses, so that the binary claim of the binary counters 26, 27, and 28 constitutes a scale of 8 counter. Accordingly, since the duration of the unit code element is 20 milliseconds in the case of the operating speed of 50 kilocycles the pulse interval $t_p$ of the sampling pulse becomes $$\frac{20}{8}\text{ ms.}=2.5\text{ ms.}$$

and the effective margin of the time division multiplex telegraph regenerative repeater becomes $$\frac{2.5}{20}\times 100=37.5\%$$

Increase of the effective margin can be made possible by adopting a counter having a higher scale than 8 instead of the counter consisting of, in combination, the counters 26, 27, and 28 and by shortening the pulse interval $t_p$ of the sampling pulse. However, in this case, it is necessary to use a circuit element the operating speed of which is more rapid.

Figure 5:
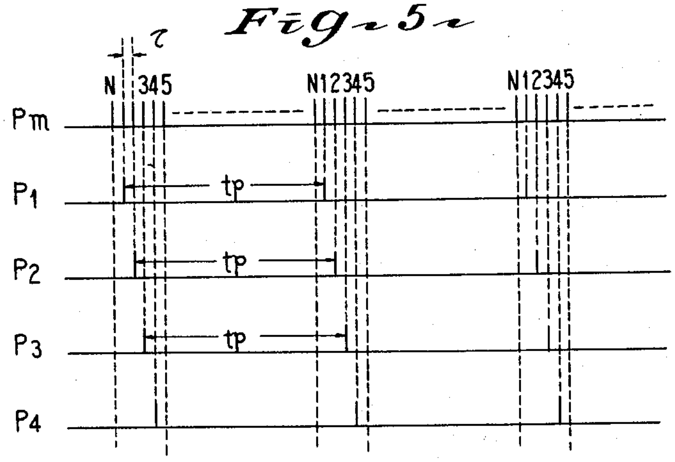
FIG. 5 is a wave form diagram for describing the multiplex time divisional operation of the time division multiplex telegraph regenerative repeater.

The above description relates to the case in which a time division telegraph regenerative repeater is used to regenerate the time division telegraph signal of a single channel. The following description relates to the case in which the repeater is adapted to regenerate the time division multiplex telegraph signal including telegraphic signals of a number of channels. In this case, as shown in FIG. 5, a time division multiplex pulse $P_m$ having a pulse interval $\tau$, that is, a pulse train obtained by superimposing the time division pulses which have been sampled by sampling pulses $P_1$, $P_2$, $P_3$ . . . $P_n$ is impressed on the input terminal 5. On the other hand, since each of the delay lines 13, 15, 18, 21, 23, and 25 has a delay time of $t_p$, each of the said delay lines has a function capable of memorizing N bit pulses per period of $t_p$, that is, one bit of the information per $$\frac{t_p}{N}(=\tau)$$

The character $\tau$ being a clock pulse interval for converting the plurality of input circuit signals into the time division multiplex telegraph signal and being indicated in FIG. 5. Accordingly, the binary counters 26, 27, 28, 29, 30, and 31 operate as time division counters. In these counters, the input pulse and output pulse are synchronized and a time division pulse corresponding to the same time division channel appears per period of $t_p$. When a time division pulse of a certain channel is taken out per period of $t_p$ and absorbed, the pulse trains become as shown in FIG. 4(*a*)(*b*) . . .(*i*). That is, each of the outputs of the binary counters 26, 27, 28, 29, 30, and 31, appearing per $t_p(=N\tau)$ indicates the counting state of the respective time division channel, but has no relation to the counting states of the other time division channels. Furthermore, the regenerative signal output circuit 9 operates, in a time divisional manner, owing to the memory character of the delay line 40. As a correlative result of the above-mentioned operations, telegraph signal regenerative operation of the time division multiplex telegraph regenerative repeater 2 proceeds independently per time division channel, whereby a time division multiplex telegraph signal having no telegraph distortion can be obtained at the output terminal 6.

The above principle of this invention has been described in connection with the case in which a start-stop teleprinter signal of five unit code, that is, a seven unit code including a start code element $S_t$ and a stop code element $S_p$ in addition to the said five unit telegraph code, is used. However, of course, the principle of this invention can be applied to the case in which any telegraph code having any unit number other than five is used. For example, when a start-stop teleprinter signal of six unit code, that is, an eight unit code including a start element $S_t$ and a stop element $S_p$ in addition to the said six code elements is used, it is necessary only to form the chain of the binary counters 29, 30, and 31 so as to be a scale of 8 counter which resets, respectively, the binary counters 29, 30 and 31 to the conditions 0+ $\underline{0}$ and $\underline{0}$ at the instant when it counts eight from the binary counter 28. As described above, construction of a counter corresponding to the chain of the binary counters 29, 30 and 31 and construction of a counter corresponding to the chain of the binary counters 26, 27, and 28 are made differently depending upon the number of sampling pulses contained in the unit code element and the unit number of the telegraph code. There is a case in which a counter having other scale than 2N, where N is a positive integer, is to be constituted. In this case, a full adder is used in the place of the above-mentioned half-adder, and a feedback pulse is applied to the binary counter of the preceding stage to the binary counter of the following stage.

The output of the above-mentioned time division multiplex telegraph regenerative repeater 2 is introduced into the output distributing unit 3. This unit 3 has the same construction as that of the input sampling unit 1 and is employed to distribute the regenerated time division multiplex signal into the corresponding output terminals and send out the said distributed signals into its corresponding output circuit after demodulation thereof. Since this output distributing unit 3 includes means corresponding to a time division multiplex demodulative circuit which has been used in the conventional time division multiplex communication, a detailed description thereof is omitted here.

Figure 6:
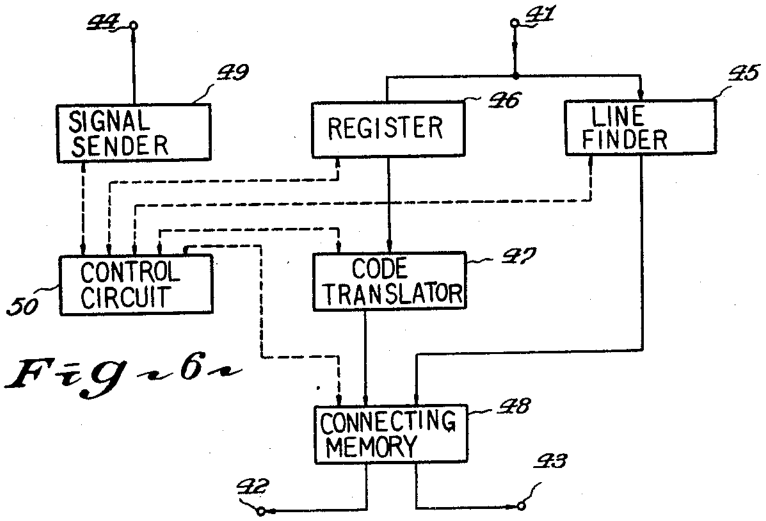
FIG. 6 is a block diagram for describing the construction and operation of the control unit in the system of FIG. 1.

In the following, construction and operation of the control unit 4 which carries out the switching operation by controlling the above-mentioned three units will be described. An example of the control unit 4 is shown in FIG. 6, wherein the input terminal 41 is connected to the sampling unit 1. When a subscriber connected to a certain input line "calls," a continuous signal which has the same polarity as the start element and is sent from the calling subscriber and is applied to the input terminal of the calling subscriber, whereby the input terminal of the calling subscriber is detected by a scanning operation of the line finder 45 so as to check whether or not the input terminal's number of the calling line is busy. The operation for detecting a calling subscriber is practically carried out by setting the calling subscriber's number against a number of busy subscribers memorized in the connection memory 48 which includes a means of memory such as a delay line. In this case, line finder 45 finds out that the calling subscriber's number does not correspond to any one of the numbers memorized in the connection memory 48, it is decided to be a new call. On the other hand, when the line finder 45 finds out that the terminals number detected by said scanning operation corresponds to any of the numbers memorized in the connection memory 48, it is decided to be not a new call and the scanning operation is continued. In the case when the line finder 45 decides rise of the new call, it catches a free register in the register 46. The input terminal's number and therefore a time division channel is occupied by the said calling line. By means of the operation of a control circuit 50, this time division channel is memorized in the above-mentioned register. As a result of the above-mentioned operation, the line of the calling subscriber is connected, in a time divisional manner, to the present switching system. On the other hand, the connecting memory 48 is constructed by such a method as to connect, in parallel, loop delay lines each having a function capable of memorizing the same number of bits of the number of the time division channels in the transmission path or highway, the number of said loop delay lines being made equal to the number of digits corresponding to the binary coded total number of the input terminals at the input sampling unit. As described above, when the input terminal's number of the calling subscriber is written-in in the connecting memory 48, the signal sender 49 is controlled by a control circuit 50 so as to send out to the calling subscriber a so-called "proceed to select signal" corresponding to the dial tone of a conventional telephone switching system. The calling subscriber having received the "proceed to select signal" sends out the called subscriber's number. This number of the subscriber called is stored in the register 46 for a time and then the stored number of said called subscriber is transmitted to a code translator 47 from the register 46. In this code translator 47, the input thereof which is a telegraph signal translated into a binary number representative of the number of the output terminal connected to the called subscriber and the said translated number written-in in the connecting memory 48. In this example, the gate circuit of the input sampling unit 1 to which the transmitting sides of the calling subscriber and the called subscriber are connected and the gate circuit of the output distributing unit 3 to which the receiving sides of the calling subscriber and the called subscriber are connected are synchronously opened and closed in a time divisional manner by means of the operation of the connecting memory into which the terminal's numbers of the calling line and the called line are memorized, so that the calling line and called line are time divisionally connected. The signal sender 49 is adapted to send out various service signals such as a bell signal, a busy signal and a "proceed to select signal." The control circuit 50 controls each of the said elemental circuits so that the above-mentioned switching operation may be carried out in a smooth manner.

In the foregoing disclosure, the general operation of the control unit 4 has been described.

However, the operation of the said unit 4 will be further described as follows. One communication circuit as formed by two time division channels. When each of the input lines is connected with a fixed one of the output lines without insertion of a switching operation the system shown in FIG. 1 can be employed as a time division regenerative repeater.

The time division telegraph switching system of this invention can be combined with a space division telegraph switching system. That is, when two identical systems as described above are arranged side by side, and the subscriber lines are connected in parallel to said systems, the two said systems can exhibit all of their switching capacities in the normal state, but when one of the systems is damaged, the traffic capacity becomes half. However, maintenance of the damaged system can be carried out without disturbing the operation of the other system.

As described above in detail, the system of this invention can exhibit sufficiently the characteristics of the time division switching system, because telegraph distortion due to the quantization is not produced by use of a time division multiplex telegraph regenerative repeater. That is, the system of this invention has various advantages such as that the dimensions of the apparatus can be miniaturized so as to be smaller than $\frac{1}{10}$ of that of the conventional space division system, for the same traffic capacity; that the essential floor space becomes small; and that the equipment is fairly economical in power consumption, equipment cost, and the cost of maintenance.

Vacuum tubes, transistors, parametrons, Esaki diodes and the like can be utilized as component elements of the system of this invention. Moreover, in the system of this invention, since any telegraph distortion due to the quantization is not produced even when an element, the operating speed of which is relatively slow, is used, and the clock frequency is selected to be low, a system having a relatively large traffic capacity can be obtained.

Since it is obvious that many changes and modifications can be made in the above-described detail without departing from the nature and spirit of the present invention, it is to be understood that the present invention is not to be limited to the details described herein except as set forth in the appended claims.

What we claim is:

1. A time division telegraph switching system, comprising an input unit for receiving and converting input telegraph signals with start-stop code elements applied from a plurality of input lines into a time division multiplex pulse signal, a plurality of input lines connected to said unit to apply said input telegraph signals thereto, at least one highway connected to the input unit, at least one time division multiplex telegraph regenerative repeater in said highway, an output unit connected to said highway for distributing said time division multiplex signal to respective output lines, output lines connected to said output unit, a control unit for timing respective sampling pulses of the input unit with respective sampling pulses of the output unit whereby said input lines are operably connected to corresponding output lines so as to compose respective telegraph channels, said repeater comprising a start-stop for generating pulses having the same period as that of the time division multiplex pulse signals of the highway and allotting said pulses successively to respective channels for a period equal to the number of telegraph channels-times the period and effective to start to generate said pulses in an independent manner for each of said channels at an instant when the start code element of each channel is sampled, a start-stop counter for counting the output pulses of said generator independently of each channel, whereby a pulse signal is generated in a period equal to the duration of the telegraph signal element without telegraph distortion independently of each channel and determining independently of each channel the duration of pulse trains generated successively from the pulse generator, a regenerative signal output circuit for gating independently of each channel the time division multiplex signal of the highway by use of said pulse signal, whereby the time division multiplex signal is regenerated independently of each channel.

2. A system according to claim 1, in which said control unit comprises a line finder for detecting calling lines corresponding to the input lines, a plurality of registers for memorizing the called line's number corresponding to an output line to be connected to the calling line, a code translator for translating the called line's number into a binary number, a connection memory having memory means for timing respective sampling pulses of the input unit with respective sampling pulses of the output unit by outputs of the line finder and said registers.

References Cited in the file of this patent

UNITED STATES PATENTS

| | | |
|---|---|---|
| 2,616,975 | Bond | Nov. 4, 1952 |
| 2,705,261 | Confora et al. | Mar. 29, 1955 |
| 2,987,577 | Faulkner | June 6, 1961 |